United States Patent [19]

Carlson

[11] E Re. 31,456

[45] Reissued Dec. 6, 1983

[54] HIGH CAPACITY FOLDED MOVING BED ION EXCHANGE APPARATUS AND METHOD FOR TREATING PHOSPHORIC ACID

[75] Inventor: Lee G. Carlson, Willow Springs, Ill.

[73] Assignee: American Petro Mart, Inc., Bartow, Fla.

[21] Appl. No.: 424,676

[22] Filed: Sep. 27, 1982

Related U.S. Patent Documents

Reissue of:

[64] Patent No.: 4,280,904
Issued: Jul. 28, 1981
Appl. No.: 7,980
Filed: Jan. 31, 1979

U.S. Applications:

[63] Continuation-in-part of Ser. No. 895,817, Apr. 12, 1978, Pat. No. 4,228,001.

[51] Int. Cl.[3] ..... B01D 15/02

[52] U.S. Cl. ..... 210/676; 210/189; 210/274; 210/684; 210/687

[58] Field of Search ..... 210/189–191, 210/268, 269, 274, 275, 288, 673, 675–677, 682–688, 681; 423/6, 7, 316, 321 R

[56] References Cited

U.S. PATENT DOCUMENTS

| | | | |
|---|---|---|---|
| 3,130,151 | 4/1964 | Levendusky | 210/675 |
| 3,152,072 | 10/1964 | Yomiyama et al. | 210/676 |
| 3,492,092 | 1/1970 | Higgins | 210/676 |
| 3,663,163 | 5/1972 | DePree et al. | 210/672 |

FOREIGN PATENT DOCUMENTS

| | | | |
|---|---|---|---|
| 2708315 | 9/1977 | Fed. Rep. of Germany | 210/274 |

*Primary Examiner*—Ivars C. Cintins

[57] ABSTRACT

A method and apparatus is provided for removing large volumes of contaminants or for recovering valuable minerals present in trace amounts or greater quantities by ion exchange treatment of phosphoric acid liquids or the like as they flow through a resin bed wherein ions in the liquid are sorbed into the resin by an ion exchange mechanism. The resin bed is folded, moving bed which exhibits all of the advantages of a packed ion exchange resin bed. Laminar flows are developed at times in the moving bed system, while the moving bed used is of a "folded" type having a maximum height approximately one-third that of conventional, unfolded countercurrent units. The ion exchange treatment occurs within a loading vessel resin bed, the beads in the feed portion of which become exhausted and sequentially move out of the loading vessel for subsequent regeneration and rinsing, followed by eventual return to the loading vessel.

47 Claims, 1 Drawing Figure

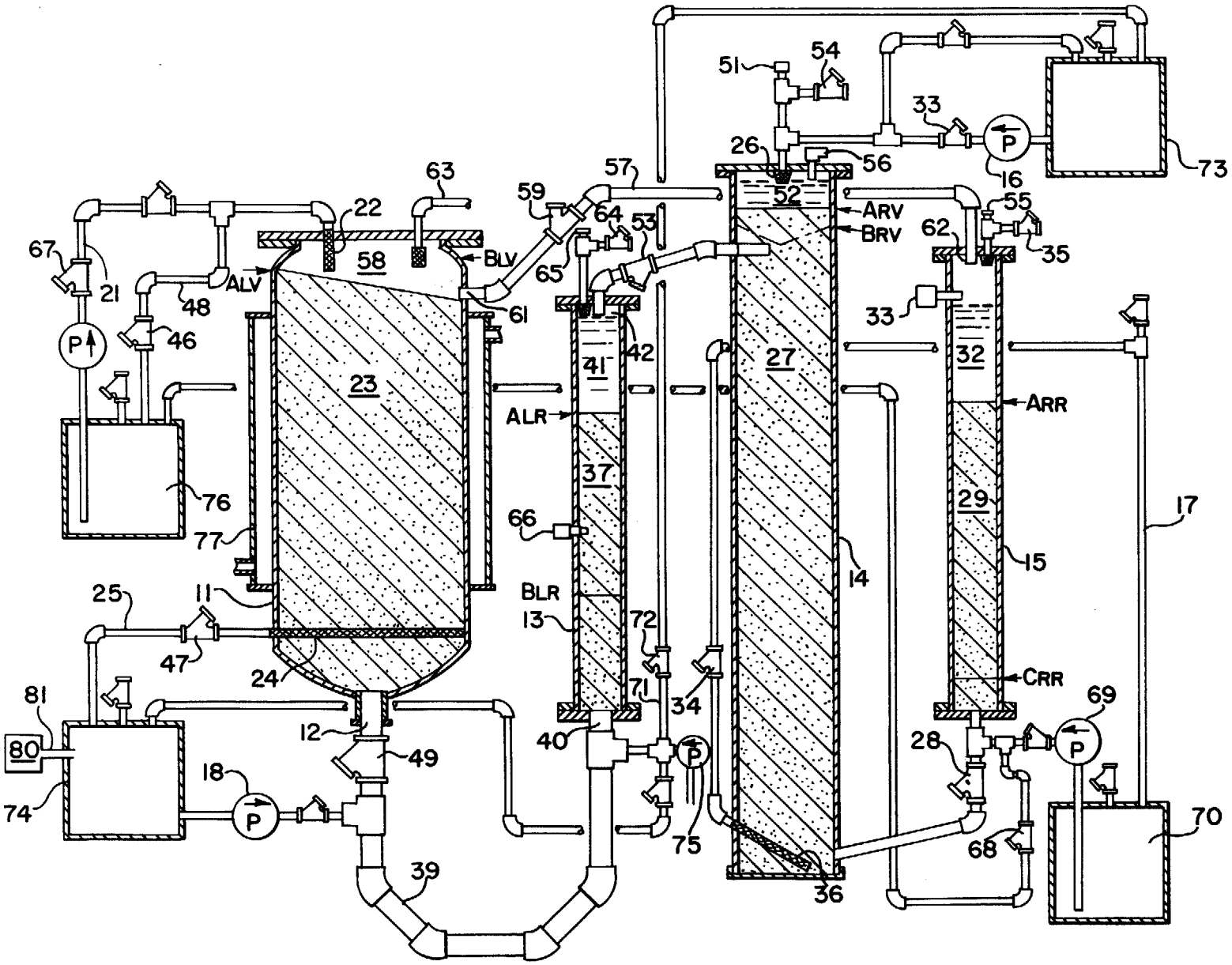
ARR
CRR
ARV
BRV
ALR
BLR
BLV
ALV

HIGH CAPACITY FOLDED MOVING BED ION EXCHANGE APPARATUS AND METHOD FOR TREATING PHOSPHORIC ACID

Matter enclosed in heavy brackets [ ] appears in the original patent but forms no part of this reissue specification; matter printed in italics indicates the additions made by reissue.

This is a continuation-in-part of application Ser. No. 895,817, filed Apr. 12, 1978, *now U.S. Pat. No. 4,228,001.*

The present invention generally relates to a moving bed ion exchange apparatus and method, especially one incorporating folded resin flows to signficantly reduce the height of the apparatus and thus decrease the amount of head space required. More particularly, this invention achieves folded features in a high capacity countercurrent system having the ability to treat large flows of phosphoric acid liquids and efficiently regenerate and rinse the large movement of recirculating resin beads needed in order to accomodate the large flows from the filters of commercial wet process phosphoric acid production plants. Countercurrent flow of the regeneration and rinsing solutions is practiced while maintaining a packed bed condition even though the system retains the advantages of a moving bed.

Moving bed ion exchange systems are known to have several advantages, especially improved efficiency, over fixed bed systems. Units such as in Higgins U.S. Pat. Nos. 2,815,322, 3,492,092, 3,580,842 and 3,579,322, and Keller U.S. Pat. No. 3,325,011 have a closed loop which incorporates a treating zone through which the liquid to be treated is passed in order to effect an ion exchange, as well as a regeneration zone wherein a regenerating solution is passed through the resin. Between successive service cycles of these systems, the resin is advanced through the closed loop for providing regenerated resin within the treating zone. Keller, for example, shows a treating zone directly above a regeneration zone, and the resin supply is pumped by compressed air to advance from the regeneration zone to the treating zone to force used resin out of the treating zone and to the pumping location. Units such as Levendusky U.S. Pat. No. 3,130,151; Yomiyama U.S. Pat. No. 3,152,072; Mihara U.S. Pat. No. 3,238,125; and Yamashiki U.S. Pat. No. 3,378,339, have multiple resin vessels and show resin movement therebetween, but they do not provide the packed bed condition and efficient resin regeneration, rinsing and movement needed in an ion exchange system having a capacity high enough to accomodate flows from commercial wet process phosphoric acid plants.

While such systems have advantages over fixed-bed systems because regenerated resin is continuously supplied, even those having multiple resin beds typically have the disadvantages of a loose bed, including development of an out of phase condition, non-laminar movement, and undesirable bed expansion.

The present invention retains the general advantages of moving-bed systems while avoiding the disadvantages of previously known moving-bed systems due to the ability of the present system to incorporate desirable packed-bed attributes into a moving-bed system. In the present invention, when moving the ion exchange resin through and between the various vessels or columns, a need to insure the retention of the liquid-to-resin relationship in phase is significantly reduced; that is, it is not especially critical to be certain the liquid never goes faster than the resin so that the interfaces stay intact and at a constant relationship to each other. A particularly advantageous property is an especially efficient use of resin within the system, to the extent that high volumes of raw phosphoric acid that is highly loaded with ions can be successfully treated. By the present invention, the resin bed is in a packed condition at all treatment times.

In another aspect of this invention, the present system unlike prior art systems does not move the entire resin inventory during the resin transfer, which total movement results in extensive mixing of resin and fluid causing substantial fluid slippage in the direction of resin movement within a system in which it is critical to maintain good liquid interfaces, whereby the liquid moves faster than the bed so that the liquid and the ion exchange resin material are not in contact with each other for a period of time sufficient to achieve the desired result, whether that result be an ion exchange or the removal of entrained liquids. When such a unit exhibiting fluid slippage goes back on stream after having been shut down for a significant period of time, the chemical efficiency of the unit is lost until the bed repacks itself and re-establishes equilibrium conditions, which could take as long as twenty percent of the time required to complete an entire closed loop cycle for short cycles of several minutes.

Another aspect of this invention brings with it an advantageous "stage height" feature which approximates the functional operation of a fractionating tower whereby, for example, in the regeneration vessel or column, the purest resin is on contact with the purest regeneration fluid; and, as the resin becomes more contaminated in the lower portions of that column, the regenerating liquid likewise becomes correspondingly more contaminated, with the most contaminated regenerating fluid within the regeneration reservoir being in contact with the spent ion exchange resin just received from the treating or loading vessel. Such a stage height feature provides the maximum equilibrium or mass flow kinetic effect possible in such a system.

A still further aspect of this invention is the fact that the various passageways or distributors of the moving resin bed have a very simple construction and may enhance fluid distribution across the resin bed to eliminate channelling. In prior art systems, large hydraulic forces are developed, requiring massive reinforced distributors which caused obstructions to resin flow or requiring a multiplicity of various small distributors at the bottom of the loading vessel, often to the point that the cross-section was almost entirely screened, which developed points of resin stagnation and resistance to resin flow, thereby inhibiting smooth flow distribution in the vicinity of the fluid discharge in the resin bed. These disadvantages are avoided with the present invention.

Another problem with previously known moving-bed systems is the need to accomplish additional start up operations after the system has been idle for relatively long periods of time, such as for several weeks. When such previously known systems were left standing idle for long periods of time, the resin would first have to be transferred manually in order to loosen up the resin packed around and obstructing the operation of the valves, this manual operation usually having to be followed by running the system through several cycles in order to place the system into proper startup condition before actually proceeding with the ion exchange operation on the liquid to be treated. Some systems incorporate a pulsing circuit to move resin while off stream. In accordance with the present invention, the system, even after having been idle for several weeks and without a pulsing circuit, can be immediately started up anywhere within the total program cycle without having to manually transfer any resin or run through start-up cycles.

By yet a further aspect of this invention, two or more complete units thereof are coupled together in an appropriate manner whereby there can be accomplished the removal from phosphoric acid liquids of undesirable substances or diluents as well as the recovery of desirable substances such as uranium or other valuable minerals.

It is, therefore, a general object of the present invention to provide an improved apparatus and method for conducting ion exchange operations through a moving resin bed.

Another object of the present invention is an improved method and apparatus which accomplishes a high capacity flow or resin throughout the system while maintaining countercurrent flow to the extent that there is a significant reduction in the criticality that the resin interfaces throughout the system be maintained intact.

Another object of the present invention is to provide an improved moving-bed ion exchange resin system which proceeds through sequential steps during which the liquid being treated moves in a downflow manner, with the upper or initial portion of the loading vessel resin bed having removed therefrom for subsequent regeneration, rinsing, and reuse.

Another object of this invention is to provide a system suitable for either or both removing contaminants and recovering valuable material such as precious metals from a phosphoric acid liquid or the like, when high quantities or trace amounts of those contaminants or valuable materials are present in the liquid.

Another object of the present invention is to provide a method and apparatus for treating high capacity flows from the filters of a wet process phosphoric acid production plant which includes stripping individual resin beads of fluid adhering to their surfaces in order to enhance their sorption efficiency and in order to facilitate their subsequent movement between vessels.

Another object of the present invention is to provide an improved ion exchange resin system which is of the moving-bed type affording sequentially continuous operation but which is and has the advantages of a packed bed system.

Another object of this invention is an improved apparatus and method having a "stage height" or gradient feature similar in end results to that of a fractionating tower whereby the purest resin is in contact with the purest regenerating fluid and progressively more contaminated resin is correspondingly in contact with progressively more contaminated regenerating fluid.

These and other objects of the present invention will be apparent from the following detailed description of this invention, including the various aspects thereof, taken in conjunction with the accompanying drawings wherein:

The FIGURE is a schematic elevational view of the preferred downflow, folded moving-bed ion exchange system in accordance with this invention.

In the basic operation of the moving-bed system illustrated in the FIGURE, the raw phosphoric acid feed liquid to be treated passes down through ion exchange resin within a loading vessel 11. Regenerated and rinsed resin enters loading vessel 11 at an inlet 12 as resin transfer proceeds by movement of the resin interfaces between a loading reservoir 13, a regeneration vessel 14, and a regeneration reservoir 15. Regenerant solution enters the system through a pumping means 16, and proceeds through regeneration vessel 14, and out a waste conduit 17. Usually prior to regeneration, air passes through loading reservoir 13 to purge liquid therefrom in order to dry and initially remove regeneration solution from the resin therein to prepare a semi-dry resin, after which rinse liquor enters the system through a pumping means 18, moves through and then with the semi-dry resin within the loading reservoir 13 and the bottom neck thereof, thereby building up pressure therewithin, which pressure is intermittently released and built up in order to cause residual air entrapped in the semi-dried resin to be removed from this resin and vented out of the loading reservoir 13 to enhance subsequent movement and ion exchange efficiency of this resin. During regeneration, an ion exchange takes place whereby those ions which were sorbed on the resin within the loading vessel 11 are removed from the resin within the regeneration vessel 14. The rinse liquor completes washing away of the regeneration solution from the interstices between the resin beads in the loading reservoir 13, which washing has been facilitated by reducing surface tension on the surfaces of the beads by forming the semi-dry resin and then removing the residual entrapped air.

With more particular reference to the FIGURE, the feed liquid to be treated is fed into the system through a feed conduit 21 and enters loading vessel 11 through a distributor 22 through a generally closed vessel 11, after which it passes, preferably in a downflow manner, through packed ion exchange resin bed 23 at a loading height $B_{LV}$. After passing through the packed resin bed 23, the thus purified and treated liquid exits the resin bed 23 through a collecting means 24. Means 24 illustrated in the FIGURE takes the form of a cylinder of a diffusing material such as screening or a slotted panel which permits the treated liquid to flow therethrough but blocks passage of individual resin beads from bed 23, a particularly suitable diffusing material being a 60 mesh polyester screening. Feed liquid entering the collecting means 24 is phosphoric acid treated in accordance with this invention; it passes out of the loading vessel 11 through a product efflux conduit 25.

Treatment of the feed liquid within the packed ion exchange resin bed 23 reduces the ion exchange capability thereof and, in general, substantially exhausts the top interface and upper portion of the resin bed 23, which interface and upper portion are removed from loading vessel 11 and are later regenerated. In order to maintain the loading height $B_{LV}$ during ion exchange treatment of the feed liquor, a regenerated and rinsed supply of ion exchange resin enters the loading vessel 11 through the inlet 12 often without disturbing the resin interfaces. Prior to such passage through the inlet 12, the resin has been subjected to regeneration of the ion exchange resin and rinsing the regenerating solution from the interstices of the moving packed resin bed.

More particularly, a regenerating solution, of a predetermined strength, enters the system through the pumping means 16, which may be a centrifugal pump, a gear pump, a piston and cylinder arrangement, an air or hydraulic cylinder devices, or the like, preferably being capable of metering the flow of regenerating solution into the system. The regenerating solution then enters the regeneration vessel 14 through a distribution head 26, which may take the form of a cone, a tube, or a pancake cylinder having a relatively fine mesh passageway therethrough for the passage of liquid such as the regenerating solution, while preventing individual resin beads from entering the head 26.

During this stage, resin bed 27 of the regeneration vessel 14 will be packed to a height $A_{RV}$, and regenerating solution flows downwardly through the regeneration vessel 14 because valve 34 of waste conduit 17 is opened, while all other possible exit paths from regeneration vessel 14 are closed by suitable valves. The amount of regenerating solution utilized for each regeneration cycle can be governed by any suitable means, such as the activation of a sensor or by metering a predetermined volume of regenerating solution passing through a preselected location, such as a valve 33. In any event, an adequate amount of regenerating solution is passed through regeneration vessel 14, after which the regenerating solution, now a waste liquor, is discharged out of the bottom of vessel 14 by means of a foraminous member or strainer 36 while the valve 28 in the conduit between vessel 14 and regeneration reservoir 15 is closed.

Purging means and rinsing means are provided to treat resin bed 37 within the loading reservoir 13, generally at a height $A_{LR}$. Purging means includes a supply of low pressure air or other fluid such as nitrogen or a special liquor passing through opened valve 64, into and through resin column 37, and out conduit 71 by way of open valve 72, to thereby pass an initial volume of regenerating solution from out of the resin interstices (about 40% of the bed's volume) and to regenerating solution reservoir 73, which gives the resin bed 37 a semi-dry character.

Pumping or injection means 18, or alternatively a special rinse liquor injection means 75, then is activated to introduce a fixed amount of rinse liquor, which may be treated liquor, deionized water, and/or as in the illustrated embodiment, the phosphoric acid product refined within the apparatus. Rinse liquor from product storage tank 74 moves into transfer pipe 39 while valve 49 is closed, the rinse liquor passing through pipe 39, the neck opening 40 of loading reservoir 13 and into the loading reservoir 13 itself. The semi-dry resin within the neck and the reservoir at first resists movement by the rinse liquor until the rinse liquor passes through the interstices of the semi-dry resin, while all other passageways out of reservoir 13 remain closed until a pressure build-up occurs, after which vent valve 65 is opened to release the pressure build-up and remove air from the interstitial volume and force out residual regenerating solution adhering by surface tension to the beads. Preferably, vent valve 65 is then closed, usually before the rinse liquor has passed completely through resin bed 37, to again build up pressure within reservoir 13, eventually followed by opening vent valve 65 again to remove further residual air and regenerating solution. Repetition provides a series of hydraulic forces which pass successive blocks of resin out of transfer pipe 39, through neck 40, and into reservoir 13 while simultaneously exhausting residual air and stripping residual regenerating solution from the resin beads in bed 37 to fluff the resin for maximizing its regeneration and subsequent ion transfer efficiency by restoring individual resin beads to approximately their properties prior to use. This rinsing means pushes the resin bed 37 upwardly until it reaches level $A_{LR}$, all while fluffing out residual air, water and regeneration solution to enhance the fully packed condition of the resin bed 37 and consequently of treating resin bed 23.

This rinse liquor mixes with and dilutes the regenerating solution removed from the intersticies of the bed 37, and this diluted regenerating solution typically remains in loading reservoir 13 as a liquid layer 41, above which is usually a volume 42 of air or other gas. Solution generally remains in liquid layer 41 to prevent channelling through and drying of bed 37. Typically, such diluted regenerating solution is added to loading reservoir 13 at a volume that can be retained therein until it passes out of reservoir 13 during a subsequent operation. For simple systems, the rinse liquor may be added in a fixed amount. In more complex systems, it may be desirable to add amounts that vary depending upon the amount of rinsing needed as determined by a sensor 66 which may be a conductivity probe.

Purging means and rinsing means are preferably provided to treat resin bed 29 within regeneration reservoir 15 in much the same manner that purging means and rinsing means are provided to treat resin bed 37. This purging means includes an open vent valve 55 and open drain valve 68 to permit liquid 32, which is primarily raw feed liquor, to drain from regeneration reservoir 15. Also included is a source of pressurized fluid, preferably air, or a useful liquid such as water, which passes through valve 35, into and through resin column 29, and out through valve 68, to thereby pass an initial volume of raw feed liquor from out of the resin intersticies and to the raw feed tank 76, which gives the resin bed 29 a semidry character.

Pumping means 69 provides a rinse liquor, usually water, to wash the residual raw feed from the resin and the walls of reservoir 15. Rinse liquor from storage tank 70 passes through pumping means 69 and into regeneration reservoir 15 while all other valves to reservoir 15 are closed, the rinse liquor flowing under pressure into resin bed 29, generally lifting the bed 29 while vent valve 55 is opened to rapidly release pressure that had built up within reservoir 15 and thus expunge much of the air that had been entrapped in the resin intersticies. This sequential operation of the pumping means and the vent valve 55 can be repeated as necessary to fluff the resin and remove substantially all of the entrapped air and residual liquid clinging to the resin beads by surface tension. Usually, the amount of rinse liquor is limited to the extent that reservoir 15 is not filled. Should excessive rinse liquor be pumped, this can exit through the screened conduit via the vent valve 55.

After these regeneration and rinsing procedures, a block of fresh resin from the loading reservoir 13 is ready for passage into the neck opening 40, through the transfer pipe 39, and out the inlet 12, the resin levels at the beginning of this particular stage being the levels $A_{LV}$, $A_{LR}$, $A_{RV}$ and $A_{RR}$, which are illustrated by cross-hatching in the FIGURE. During this resin transfer state, the liquid to be treated preferably does not pass into the system through the distributor 22. Instead, a bypass valve 46 is opened, an exit valve 47 is closed, and the feed liquid simply returns to its feed well 76 through bypass conduit 48.

Resin transfer can proceed when a resin valve 49, which is of a type that permits passage of packed resin but resists damage thereby, such as a ball valve or a specially designed butterfly valve, is opened and pneumatic means initiate passage or resin therethrough. A source of pressurized fluid, liquid or air under low positive pressure, can be introduced by means of a valve 51 into the upper portion of the regeneration vessel 14, which exerts pressure upon the diluted regeneration solution liquid 52 remaining on top of the packed resin bed 27. A resin valve 53 can be opened to provide passageway between the regeneration vessel 14 and the loading reservoir 13, with the result that the pressurized fluid or air which is exerting a pneumatic force on the liquid 52, which transmits that force to the resin within the upper portion of the regeneration vessel 14, causes this resin to pass through the open resin valve 53 and into the loading reservoir 13, which in turn exerts pressure upon the packed bed 37, and the entire packed bed 37 will move downwardly to about level $B_{LR}$, the movement being one of laminar flow and one that is in phase with the interstitial liquid contained in the resin bed 37, to the extent that a block of purged and rinsed resin moves through the transfer pipe 39 by way of the open resin valve 49 and into the bottom of the loading reservoir 13 through the inlet 12, thereby upwardly pushing the packed ion exchange resin bed laminarly upwardly and in phase with the interstitial liquid within bed 23 until level $B_{LV}$ is reached. The amount of resin that can be thus transferred into the loading vessel 11 is a fixed amount that is controlled by means of a vent 63 and/or the screened distributor 22 which functions as a resin dam or by suitable sensors at strategic locations within the loading vessel 11 and/or the loading reservoir 13. For safety reasons, it may be desirable to add a screened trap 67.

Preferably, especially since a large volume of resin is transferred by this apparatus, and should it be decided that an additional liquor is needed to especially condition the resin with a particular media such as an acidic or a basic one to provide optimum conditions for resin exchange in resin bed 23, valve 53 is closed, and valve 64 is opened to permit low pressure air or special liquor to enter above liquid layer 41 and build up in pressure, after which valves 46 and 49 are opened so the built-up pressure will force the block movement of the purged and rinsed resin into bed 23. When the resin reaches level $B_{LV}$ pressure build-up will reoccur to signal closing of valve 64 and thus fluid flow into reservoir 13, after which another valve 65 is opened to vent or to remove special liquor, the resin level being at about $B_{LR}$.

At this stage, if resin had been transferred from the top of bed 27 and into bed 37 for filling bed 23, the top surface of the packed resin bed 27 will be at a level $B_{RV}$, which generally takes a somewhat conical shape such as that illustrated in the FIGURE, with the liquid 52 standing above the level $B_{RV}$, and pressurized air at about 2–20 psi, preferably 3–10 psi, remaining above liquid 52 until it is released by opening a vent valve 51 after resin transfer into the loading vessel 11, at which time resin valve 49 and resin valve 53 are then closed,-thereby locking the respective resin beds at approximately level $B_{LV}$, $A_{LR}$ and $B_{RV}$.

If the preferred means for transferring resin into bed 23 is utilized, it is necessary to subsequently activate the transfer means needed to move resin into loading reservoir 13 to return its resin height from about $B_{LR}$ to about $A_{LR}$. Transfer valve 53 and vent valve 65 open, as does valve 54 by which low pressure air or other pressurized fluid such as regenerating solution from tank 73 exerts pressure upon liquid 52, such pressure being transferred to resin at level $A_{RV}$ to push that resin until level $B_{RV}$ is reached, usually after all resin between levels $A_{RV}$ and $B_{RV}$ have moved, along with liquid 52, into loading reservoir 13.

Next, the regeneration vessel 14 will be refilled with packed resin from tne regeneration reservoir 15 so that the level of the packed resin bed at 27 will return approximately to level $A_{RV}$. Vent valve 51 remains open, and compressed air, at about 2 to 20 psi, preferably 3–10 psi, enters by valve 35 to pressurize liquid 32 which in turn exerts a pneumatic force downwardly on the packed resin bed 29 to move it down to level $C_{RR}$ as the lower portion of packed resin bed 29 moves laminarly downwardly and through the pipe and valve 28, to move the packed resin bed 27 laminarly upwardly until it approximates level $A_{RV}$. Valve 35 closes and the compressed air supply ceases at a predetermined time such as when the liquid 52 is contacted by a sensor 56 within the regeneration vessel 14, after which the vent valve 51 also closes, and vent valve 55 opens to release the compressed air from the regeneration reservoir 15, thereby equalizing the pressure on the resin bed surfaces within the regeneration vessel 14 and within the regeneration reservoir 15.

In order to refill the regeneration reservoir 15 with resin and remove spent or exhausted resin from the upper portion of the loading vessel 11, a resin slurry transfer conduit 57 is provided. It is preferred in large capacity units that the resin slurry transfer conduit 57 pass resin while the feed liquid being treated is circulating into the packed ion exchange resin bed 23 within the loading vessel 11 while valve 47 is closed. During such flow passage, there is a pressure drop of several pounds down through the resin bed 23, which pressure drop will enhance slurry formation and will pass the resin from out of section 58 of vessel 11 and through the resin slurry transfer conduit 57 when a further resin valve 59 is opened. Spent resin leaves through an orifice 61 within the section 58, the resin being pushed or pulsed therethrough by feed or other liquid from the distributor 22. Actually, the material passing through resin transfer conduit 57 is a slurry of spent resin and liquid. This resinous slurry enters the regeneration reservoir 15 at aperture 62, which slurry displaces much of the air remaining in the regeneration reservoir 15 on top of the liquid above resin level $C_{RR}$, the air being displaced through the opened vent valve 55, while the resinous slurry entering through aperture 62 continuously raises the level $C_{RR}$, generally until it reaches a height approximating the level $A_{RR}$, with the liquid from this slurry passing into the regeneration reservoir 15 until a preset occurrence, such as when a sensor 33 is activated to generate a signal to close the resin valve 59 and the vent vavle 55. Alternatively, excess liquid also could exit through vent valve 55 and be saved for further processing. Typically, the transferred resin will be allowed to settle within regeneration reservoir 15.

At this stage, all of the resin levels will have been returned to their respective levels $A_{LV}$, $A_{LR}$, $A_{RV}$ and $A_{RR}$ so that the system will be ready for the next resin transfer sequence.

When it is desired to produce a final liquid product that has both cation and anion removal means, one or more additional treatment systems 80 may be provided, whereby the structure shown in the FIGURE is substantially repeated, and the transfer conduit means 25 or the storage tank 74 is connected by a suitable conduit such as 81 for communication with a conduit on the order of feed conduit 21. In such a plural system, the resin movement in each system is substantially the same as that in the single system, with the units being synchronized so that each of the cation and the anion loading vessels are off stream at that point where the freshly regenerated resins are transferred into each vessel. For example, a vessel containing an anion resin for recovering uranium when it exists in anionic form can be downstream of cation vessel conduit 25 which removes diluents, especially calcium and magnesium, from wet process phosphoric acid. Other entire systems could likewise be lined up in series for tasks such as using cation resin to recover cationic forms of uranium.

In proceeding with the method in accordance with this invention, substances are removed from a feed liquid of wet process phosphoric acid from the filters of extracting equipment, the substances being generally in the ionic form, but they may also be complexed ions in a weakly ionic form, to thereby either clarify the feed liquid and/or recover valuable materials therefrom, whereby large volumes or trace amounts can be removed in either case. The method proceeds in a folded manner to avoid the requirement of having extensive head space to accomplish the method. Packed resin beads are recycled in the manner of a moving bed, and various liquids pass therethrough. The method substantially eliminates concern for maintaining constant relationships between the numerous interfaces of liquids and the resin, while still enhancing and maximizing the ion exchange process so that it approaches stoichiometric ratios. Additionally, as a consequence of some laminar and packed bed movements, no resin bed expansion is experienced which would bring with it a consequent loss of the packed bed effect and its attendant superior ion exchange properties. Furthermore, the method includes rapidly washing large volumes of resin beads with enhanced efficiency in order to remove residual fluids from around the beads which would reduce the ion exchange capabilities of the beads.

In general, since the feed liquid being treated has a relatively high concentration of ions or complexed ions to be removed therefrom, a moving resin bed of a large volume relative to that of the feed liquid will be circulated relatively frequently. Due to the high concentration of ions in wet process phosphoric acid, having about 5 weight percent of total diluents, each volume of resin must treat a relatively low volume of phosphoric acid when compared with conventional ion exchange methods. This invention is capable of satisfactorily clarifying as low as 178 volume of phosphoric acid for each volume of resin, although ratios this low begin to require equipment sizing that becomes cumbersome and uneconomic. Typically, a ratio range of between 1 and 30 volumes of raw acid per volume of resin will be most satisfactorily practiced, with a most advantageous range being between 2 to 5 volumes of raw acid for each resin volume.

The ion exchange operation within the loading vessel 11 sorbs the ions to be removed and/or collected into the packed ion exchange resin bed, such ions releasing and replacing other ions which had been in the sites located in the resin beads in order to effect a beneficial exchange of ions. This exchange phenomenon requires that the resin beads have a greater affinity for the ions to be removed from the feed liquid than for the ions in the fresh resin, which calls for an appropriate selection of resin beads, which appropriate selection can often be in accordance with principles known in the art and published specifications on particular resin beads. Preferably, the raw feed is treated while hot from phosphoric acid production filters, usually at a temperature of about 100° to 160° F. Temperature maintenance can be facilitated by jacket 77.

While a raw acid or other pulsing liquid flow takes place, an upper portion of the resin beads having undergone this ion exchange are passed in slurry form with pulsing liquid from out of the top of the packed resin bed or column and into a regeneration reservoir column for a purging and washing step prior to a regeneration step, those contaminating or valuable ions which where were sorbed into the resin beads within the loading column being exchanged by means of a regenerating liquor with fresh ions for subsequent exchange with other contaminating or valuable ions in the moving resin bed or column. Utilizing both a regeneration reservoir column and a regeneration column contributes to the ability to carry on this method as a folded one, within a relatively low location. It also facilitates purging and washing the spent resin just prior to regeneration.

Spent resin beads entering the regeneration reservoir column are most advantageously purged and rinsed of raw phosphoric acid and its contaminants prior to attempting to regenerate the beads within the regeneration column. Purging fluid is first passed through the column to remove the bulk of the phosphoric acid within the intersticies of the beads. When air or other gas is used, the beads and raw acid are subjected to a low gas pressure of about 10 to 15 pounds per square inch gauge which also compacts the beads and causes them to stick together due to surface tension forces created by residual liquid. To alleviate this situation, purging is followed shortly by pressure-release rinsing or fluffing, preferably upwardly, to remove air and residual liquid in order to enhance the movability of the resin as well as to clean off the surface of the beads from substances, such as the raw phosphoric acid, that would interfere with the subsequent regeneration and sorption. Multiple purging, for example an air purge followed by a water purge, can be especially advantageous, particularly for high volume flows.

Pressure release rinsing subjects a closed off resin column to pressurized fluid and then that resin column is opened up to rapidly release the pressure, thereby exerting short duration, high momentum forces on the resin to "fluff" it free from entrapped air and overcome surface tension forces to remove residual phosphoric acid from the beads, which can be observed as bubbles or a froth within the rinse liquor. This pressure release rinsing simulates or approximates the ideal rinsing conditions of a free flow or fall of the resin beads through a long column of liquid to the extent that above 80% of the beads' surface area is free for sorption, but does so much more rapidly and in a much more compact form than required of a free flow.

The regeneration step includes pumping a regenerating solution, such as nitric acid or sulfuric acid, through at least a large portion of the regeneration column which includes closely packed resin beads being recycled. The regenerating liquor continues until it passes through a screen or membrane which prevents resin passage, at which time the used regenerating solution, having been turned into a waste liquid, is allowed to pass out of the system.

A purging and a rinsing or washing step is also accomplished on the regenerated resin in a manner generally similar to purging and rinsing of the regeneration reservoir column. Time savings can be realized by conducting the purging and rinsing of both columns generally simultaneously. Loading reservoir column purging with air or other fluid is accomplished in much the same manner as purging of the regeneration reservoir column to semi-dry the beads. During rinsing, the regenerated, semi-dry resin bed at below $A_{LR}$ within a loading reservoir column is washed with a rinse liquor by one or more passage of the rinse liquor, eventually together with a plug of semi-dry resin, into the loading reservoir column near its bottom end, thereby raising the level of resin within the loading reservoir column while at the same time passing the rinse liquor eventually through the entire column for movement through and with the interstitial liquid remaining within this semi-dried column in order to strip remaining liquid from beads and dilute with rinse liquor, this highly diluted liquid remaining between and often above the resin beads. The rinse liquor used in this step may be a portion of the feed liquid that has been treated by passage through the loading resin bed or column, or it may be deionized water or the like.

After the liquid to be treated flows through the packed ion exchange resin loading bed or column, the loading column moves generally upwardly in a laminar manner and the top portion thereof is removed therefrom in order to replace the most extensively spent resin beads with freshly regenerated resin beads within the packed loading column.

The resin transfer operation basically includes four resin movement steps. Prior to these resin movement steps, when beginning after feed liquid treatment, the respective resin columns will be at levels $B_{LV}$, $A_{LR}$, $A_{RV}$ and $C_{RR}$ depicted in the FIGURE.

Beginning the present discussion with resin movement after feed liquid has been processed through the loading column, the first step will be movement of the spent resin of the packed ion exchange resin loading bed or column to near the top of the regeneration reservoir column for subsequent regeneration and rinsing thereof. This step may be accomplished simultaneously in association with the passage of the feed liquid into the loading column which brings about a pressure drop of several pounds from its inlet location to its outlet location, the amount of the pressure drop being dependent upon the average size of the inlet compared with the average size of the outlet, the height of the resin bed, and the temperature and viscosity of the incoming liquid, the raw acid being very viscous.

A usual minimum pressure drop for small capacity unit is 2 psi. Preferably, the flow should be as gentle as possible to minimize resin attrition brought about by resin bead breakage as fast flow rates while being fast enough to keep the down time at a minute or less. Generally, for example, at flux of about 25 to 30 gallons/minute/square foot and at room temperature, the effective pressure drop will be about 5 psi for each foot of depth of the effective height of the loading column resin bed, up to or above 10 feet, for example. Such pressure drop will cause a transfer of a fixed volume of resin slurried with feed liquid from the loading column to about level $A_{LV}$ after passageway therefrom is provided to the regeneration reservoir column, generally until it reaches its original level $A_{RR}$, at which level liquid in the slurry is separated from the resin beads and the regeneration resin column is later compacted by the fluid purging step.

In the next such step, regenerated and rinsed resin is transferred into the bottom of the packed ion exchange resin loading bed or column by pneumatic action of a suitable pressurized fluid, such as air compressed to a pressure of about 2 to 20 pounds per square inch upon the diluted regenerating liquid mixture above the loading reservoir column, which pneumatic action passes resin to level $B_{LR}$ to move that column downwardly in laminar fashion and into the packed ion exchange resin loading column to urge this loading column upwardly in a laminar fashion until it reaches level $B_{LV}$. This step generally transfers the resin in a fixed amount, and the extent of the movement is regulated by a time and air pressure relationship, for example, for passing the correct amount of pressurized fluid into the top of the loading reservoir column. Thereafter, the compressed air is released to complete this step of the resin transfer operation. Since fresh resin has now filled the loading vessel, processing of the raw phosphoric acid liquor therethrough can resume.

Meanwhile, the depleted loading reservoir column can be returned to about level $A_{LR}$ by passage of resin thereinto from the regeneration column at a level of about $A_{RV}$ until it reaches approximately level $B_{RV}$, the movement being accomplished by pressurized fluid such as air or regeneration fluid upon the regeneration column. If air is used, a liquid layer should be present between the air supply and the resin to be moved in order to provide necessary conditions for an incipient resin slurry to be maintained, thereby facilitating resin transfer. Once transferred, the resin will settle within the liquor now present in the loading reservoir column. This column will then be subjected to the purging and rinsing operations in order to make it ready for eventual transfer into the loading column.

At the completion of the previous step, the resin in regeneration column is depleted, and the next step replenishes the column to about its original level $A_{RV}$ by passing resin from the bottom of the regeneration reservoir column into the bottom of the regeneration column. This passage is accomplished by injecting compressed air into the top portion of the regeneration reservoir column, which creates a pneumatic force on residual liquid above the resin in this column to thereby move the resin therein down to about level $C_{RR}$ while that in the regeneration column is raised to about level $A_{RV}$.

It has been found that resin requirements are optimized by including about half of the total system resin volume within the loading column and its reservoir and the other half in the regeneration essel and reservoir, acceptable volume ratios being about 10:1:10:1 for the columns as viewed from left to right in the FIGURE.

Throughout some resin transfer step, the resin transfer proceeds without disturbing the interfaces or stage heights of the loading or regeneration beds or columns, with the exception that the volume of resin actually transferred from column to column will be mixed to some degree as it passes through the appropriate passageways. The preferred downflow passage through the loading column or vessel has an important advantage over an upflow passage therethrough by automatically maintaining a packed bed condition therewithin even as attrition of the resin beads takes place. Any attrition will merely lower the levels $A_{LV}$ and $B_{LV}$, rather than cause gaps to develop in the loading vessel and consequent undesirable channeling as will occur in an upflow unit unless it is attended for the purpose of adding resin into the system to make up for attritions.

By the preferred moving bed system, the regenerated resin entering the loading column has been regenerated to 80% or more as an average of its initial, unused condition to bring about ion transfer on the order of a fresh, fixed bed. This is especially important when deep downflow loading columns are involved since acidic conditions increase down the depth of the column, which acidic conditions tend to ring about undesirable reverse ion exchange, this tendency being decreased significantly under equilibrium conditions having only about 20% at most of inactive resin rather than about 50% inactive resin for prior systems.

The following specific examples will more precisely illustrate the invention and teach the procedures presently preferred for practicing the same, as well as the improvements and advantages realized thereby.

EXAMPLE I

How raw phorphoric acid from the filters of a commercial phosphoric acid plant was treated within apparatus on the order of that shown in the Figure and having a 6-foot high loading vessel with a diameter of 4 inches, a regeneration vessel having an effective height of about 10 feet and a diameter of 3 inches, a loading reservoir having a 4-inch diameter and an effective depth of about 3 feet, and a regeneration reservoir having a 3-inch diameter and an effective depth of about 3 feet, the volume of resin within the loading vessel and its loading reservoir being about the same as the total resin volume of the regeneration vessel and its reservoir. The approximately 30% crude or raw phosphoric acid was fed at a rate of about 5 flux (gallons/minute/-square foot) at its off-filter temperature of about 140° F. and containing total diluents of about 5 weight percent was analyzed from a standing tank to include: 26.15 weight percent $P_2O_5$, and the following cationic diluents: 0.81 weight percent $Fe_2O_3$, 0.87 weight percent $Al_2O_3$, 0.74 weight percent CaO, and 0.49 weight percent MgO. HCRW (Dow Chemical Company) strong cationic resin, which is of the gel, or microreticular, type was used throughout the system, it was regenerated with 20% nitric acid, and was washed with the product phosphoric acid. Several runs through the apparatus were analyzed, the make-up of product phosphoric acid leaving conduit 25 being reported in the Table:

TABLE

| Run No. | $P_2O_5$ (wt. %) | $Fe_2O_3$ (wt. %) | $Al_2O_3$ (wt. %) | CaO (wt. %) | MgO (wt. %) |
|---|---|---|---|---|---|
| 1 | 24.90 | 0.95 | 0.44 | <0.05 | 0.06 |
| 2 | 27.80 | 1.13 | 0.57 | <0.05 | 0.05 |
| 3 | 24.85 | 0.94 | 0.40 | <0.05 | 0.04 |
| 4 | 28.35 | 1.10 | 0.56 | <0.05 | 0.03 |
| 5 | 25.85 | 0.98 | 0.47 | <0.05 | 0.03 |
| 6 | 26.65 | 1.00 | 0.48 | <0.05 | 0.04 |
| 7 | 24.85 | 0.67 | 0.61 | 0.03 | 0.05 |
| 8 | 25.80 | 0.55 | 0.63 | 0.03 | 0.04 |
| 9 | 24.85 | 0.47 | 0.62 | 0.09 | 0.04 |

Calcium and magnesium removal was excellent, as can be seen from the Table and from analyses of the stripped regeneration solution waste stream passing out of the regeneration vessel through conduit 17, found to include an average of 1.06 weight percent CaO and an average of 0.79 weight percent MgO. It was found that the particular exchange resin utilized was not especially effective for iron and aluminum sorption and removal, although the stripped regeneration solution waste stream was found to contain an average of about 0.33 weight percent $Fe_2O_3$ and of about 0.42 weight percent $Al_2O_3$.

EXAMPLE II

Raw phosphoric acid having a $P_2O_5$ content of about 30 weight percent was passed hot from the filters of a commercial wet-process phosphoric acid production plant into a holding tank and maintained at a temperature of about 140° F., after which several runs were made through an anionic exchange resin in a moving bed of a type generally on the order of that shown in the FIGURE, with a view toward recovering uranium from the raw, untreated acid. The resin used was IRA-900 (Rohm & Haas), a macroreticular strong anionic type, the regeneration solution was 20% nitric acid, and the rinsing liquor was 3 N sulfuric acid. Analyses for uranium in the raw acid and in the product phosphoric acid after treatment were as follows:

| Raw Acid | Treated Acid |
|---|---|
| 150 ppm | 8 ppm |
| 120 ppm | 7 ppm |
| 150 ppm | 8 ppm |
| 125 ppm | 8 ppm |

Also, colored organic materials were removed from the raw dark brown acid to the extent that the product phosphoric acid had but a strong brownish tint and the anionic resin had very little brown organic matter left thereon after regeneration and rinsing.

EXAMPLE III

Example II was generally repeated except the regeneration solution used was a blend of 20% nitric acid and 1 N ammonium nitrate. Analyses for uranium were as follows:

| Raw Acid | Treated Acid |
|---|---|
| 150 ppm | 7 ppm |
| 135 ppm | 8 ppm |
| 125 ppm | 8 ppm |

It will be apparent to those skilled in this art that the present invention can be embodied in various forms; accordingly, this invention is to be construed and limited only by the scope of the appended claims.

I claim:

1. A high capacity moving-bed ion exchange apparatus, comprising:

a loading vessel having a feed conduit and a collecting means for passing a raw phosphoric acid feed liquid through a ion exchange resin bed therewithin to remove diluents therefrom, said diluents including magnesium and calcium cations, said loading vessel having a resin inlet and a resin outlet;

a loading reservoir in resin-passing communication with said resin inlet of the loading vessel, said loading reservoir containing a movable resin bed;

a transfer pipe and a resin valve between said loading reservoir and said resin inlet of the loading vessel;

a regeneration vessel in resin-passing communication with said loading reservoir, said regeneration vessel having a movable resin bed and a liquid distribution means;

a regeneration reservoir in resin-passing communication with said regeneration vessel, said regeneration reservoir having a movable resin bed therewithin;

pumping means for passing regenerating solution into said regeneration vessel through said liquid distribution means;

purging means for removing liquid from the interstices of said resin within the loading reservoir to semi-dry said resin;

rinsing means for moving rinse liquor through said semi-dry resin in the loading reservoir, said rinsing means including an injection means having an outlet into said transfer pipe, said injection means outlet being between said resin valve and said loading reservoir;

pressure application means in association with said loading reservoir for moving a portion of the resin bed within said regeneration vessel into said loading vessel; and a resin slurry transfer conduit communicating said resin outlet of the loading vessel with said regeneration reservoir.

2. The apparatus of claim 1, wherein said feed conduit includes a distributor and passes through said loading vessel near a generally closed top thereof, and wherein said collecting means is within said loading vessel near the bottom thereof, whereby the feed liquid downflows through said packed ion exchange resin bed of the loading vessel.

3. The apparatus of claim 1, wherein said collecting means includes diffusing material that permits feed liquid to flow therethrough and that blocks passage of individual resin beads therethrough.

4. The apparatus of claim 1, wherein said purging means includes valve means for injecting a pressurized fluid through and out of said loading reservoir resin bed.

5. The apparatus of claim 1, wherein said purging means injects a fluid generally downwardly through the loading reservoir, and wherein said rinsing means injects a rinse liquor generally upwardly into the leading reservoir.

6. The apparatus of claim 1, further comprising a conduit pipe communicating said regeneration vessel with said regeneration reservoir near the respective bottoms of each, an upper portion of said regeneration reservoir, and valve means in communication with said upper portion.

7. The apparatus of claim 1, wherein said transfer pipe has a neck opening into said loading reservoir near the bottom thereof, said loading reservoir has an upper portion, and a conduit communicates said loading reservoir upper portion with said regeneration vessel near the top thereof, whereby said rinse liquor injection means passes rinse liquor through said transfer pipe and neck opening, and upwardly in said loading reservoir.

8. The apparatus of claim 1, further comprising a pressurized fluid source having a valve opening into an upper portion of said regeneration vessel, a resin valve along said resin passing communication between the regeneration vessel and the loading reservoir, whereby opening said pressurized fluid valve exerts pneumatic pressure on said movable packed resin bed of the regeneration vessel to move resin through said resin valve from the regeneration vessel into the loading reservoir.

9. The apparatus of claim 1, wherein said pressure application means for passing resin from said loading reservoir to said loading vessel includes a valve opening into an upper portion of said loading reservoir for permitting fluid to enter said upper portion to exert a force upon said movable resin bed of the loading reservoir.

10. The apparatus of claim 1, further comprising an upper portion of said regeneration reservoir, a pressurized fluid source having a valve opening into said regeneration reservoir upper chamber, and an open vent valve within said regeneration vessel, whereby opening said pressurized fluid valve exerts a pneumatic pressure onto said movable resin bed of the regeneration reservoir to move a portion of same through said communication into the regeneration vessel to replenish said movable resin bed of the regeneration vessel.

11. The apparatus of claim 1, further comprising a valve in said resin slurry transfer conduit, said valve being open while feed liquid moves from said feed conduit to said collecting means of the loading vessel for passing a slurry of spent resin and feed liquid from said loading vessel through said resin slurry transfer conduit into said regeneration reservior to replenish said movable resin bed thereof.

12. The apparatus of claim 1, wherein said collecting means of the loading vessel communicates with an additional high-capacity moving-bed ion exchange apparatus of substantially the same structure as the apparatus of claim 1, said additional apparatus recovering uranium values from said acid.

13. A high capacity moving-bed ion exchange apparatus, comprising:

a loading vessel having a feed conduit and a collecting means for passing a raw phosphoric acid feed liquid through an ion exchange resin bed therewithin to remove diluents therefrom, said diluents including magnesium and calcium cations, said loading vessel having a resin inlet and a resin outlet;

a loading reservoir in resin-passing communication with said resin inlet of the loading vessel through a transfer pipe, said loading reservoir containing a movable resin bed, said loading reservoir having a bottom neck opening in communication with said transfer pipe;

a regeneration vessel in resin-passing communication with said loading reservoir, said regeneration vessel having a movable resin bed and a liquid distribution means;

a regeneration vessel reservoir in resin-passing communication with said regeneration vessel, said regeneration reservoir having a movable resin bed therewithin;

pumping means for passing regeneration solution into said regeneration vessel through said liquid distribution means;

purging means for removing liquid from the interstices of said resin within the loading reservoir to semi-dry said resin;

rinsing means for moving rinse liquor through said semi-dry resin in the loading reservoir;

pressure application means in association with said loading reservoir for moving a portion of the resin bed within said regeneration vessel into said loading vessel; and a resin slurry transfer conduit communicating said resin outlet of the loading vessel with said regeneration reservoir, wherein said rinsing means includes an injection means for introducing rinse liquor into the transfer pipe and the loading reservoir through said bottom neck opening thereof, valve means for initially closing all passageways out of the loading reservoir while the injection means is introducing rinse liquor under pressure and for then releasing pressure build-up in the loading reservoir.

14. The apparatus of claim 13, wherein said valve means closes and releases pressure build-up a plurality of times to incrementally treat the resin.

15. A high capacity moving-bed ion exchange apparatus, comprising:

a loading vessel having a feed conduit and a collecting means for passing a raw phosphoric acid feed liquid through an ion exchange resin bed therewithin to remove diluents therefrom, said diluents including magnesium and calcium cations, said loading vessel having a resin inlet and a resin outlet;

a loading reservoir in resin-passing communication with said resin inlet of the loading vessel, said loading reservoir containing a movable resin bed;

a regeneration vessel in resin-passing communication with said loading reservoir, said regeneration vessel having a movable resin bed and a liquid distribution means;

a regeneration reservoir in resin-passing communication with said regeneration vessel, said regeneration reservoir having a movable resin bed therewithin;

pumping means for passing regenerating solution into said regeneration vessel through said liquid distribution means;

purging means for removing liquid from the intersticies of said resin within the loading reservoir to semi-dry said resin;

rinsing means for moving rinse liquor through said semi-dry resin in the loading reservoir;

pressure application means in association with said loading reservoir for moving a portion of the resin bed within said regeneration vessel into said loading vessel; and a resin slurry transfer conduit communicating said resin outlet of the loading vessel with said regeneration reservoir, wherein said rinsing means includes an injection means for introducing rinse liquor into a transfer pipe providing said resin-passing communication etween the loading vessel and the loading reservoir, a valve for closing off said transfer pipe between said injection means and said loading vessel, valve means for initially closing all passageways out of the loading reservoir while the injection means is introducing rinse liquor and for releasing pressure build-up in the transfer pipe and the loading reservoir, whereby gases and residual liquid are removed from the semi-dry resin.

16. The apparatus of claim 15, wherein said valve means closes and releases pressure build-up a plurality of times to incrementally treat the resin.

17. The apparatus of claim 1, 13 or 15, further comprising purging means for removing liquid from the intersticies of said resin in the regeneration reservoir to semi-dry said resin; and rinsing means for moving rinse liquor through said semi-dry resin in the loading reservoir.

18. The apparatus of claim 17, wherein said regeneration reservoir rinsing means includes an injection means for introducing rinse liquor into the regeneration reservoir, valve means for initially closing all passageways out of the regeneration reservoir while said injection means is introducing rinse liquid under pressure and for releasing pressure build-up in the regeneration reservoir.

19. The apparatus of claim 18, wherein said regeneration reservoir valve means closes and releases pressure build-up a plurality of times to incrementally treat the resin.

20. The apparatus of claim 17, wherein said regeneration reservoir purging means includes valve means for injecting a pressurized fluid through and out of said regeneration reservoir resin bed.

21. The apparatus of claim 17, wherein said regeneration reservoir purging means injects a fluid generally downwardly through the loading reservoir, and wherein said regeneration reservoir rinsing means injects a rinse liquor generally upwardly into the regeneration reservoir.

22. A high capacity moving-bed ion exchange method, comprising:

providing a movable ion exchange resin bed within a plurality of columns, said plurality including a loading column, a loading reservoir column, a regeneration column, and a regeneration reservoir column;

flowing a raw phosphoric acid feed liquid through said loading column to remove ionic materials therefrom;

passing spent resin beads from and out of said loading column to said regeneration reservoir column;

transferring a portion of loading reservoir column having purged and rinsed resin into said loading column;

transferring a portion of said regeneration column into said loading reservoir column;

purging said loading reservoir column to remove liquid from intersticies of resin therein and thereby semi-dry the resin;

rinsing said semi-dry resin by moving rinse liquor through the semi-dry resin in the loading reservoir;

transferring a portion of said regeneration reservoir column into said regeneration column; and regenerating at least a portion of said regeneration column by passing a regenerating solution therethrough;

wherein said rinsing step includes injecting rinse liquor at a location between the loading column and the loading reservoir column so as to build-up pressure within the loading reservoir column, and releasing the pressure build-up to remove gases and residual liquid from the semi-dry resin.

23. The method of claim 22, wherein said flowing step is generally downwardly through the loading column.

24. The method of claim 22, wherein said flowing step creates a pressure drop through said loading column to assist in said step of passing spent resin beads from and out of said loading column.

25. The method of claim 22, wherein said flowing step includes having the raw phosphoric acid feed liquid at a temperature between about 100° to 160° F., said raw acid being about 30 weight percent phosphoric acid and including about 5 weight percent total diluents.

26. The method of claim 22, wherein said step of passing resin from and out of the loading column transfers a slurry of feed liquid and spent resin from an upper portion of said loading column to an upper portion of said regeneration reservoir column.

27. The method of claim 22, wherein said purging step includes injecting a pressurized fluid through and out of said loading reservoir column.

28. The method of claim 22, wherein said step of transferring resin from said loading reservoir column to said loading column includes applying a supply of pressurized fluid above said regeneration column, thereby effecting said transferring of a portion of said loading reservoir column into said loading column, this transferring step being of a lower portion of said loading reservoir column to raise said loading column by resin movement at a lower portion thereof.

29. The method of claim 22, wherein said step of transferring resin from said regeneration reservoir column to said regeneration column includes applying a supply of pressurized fluid above said regeneration reservoir column to hydraulically move said regeneration reservoir column downwardly to effect said transferring of a portion of said regeneration reservoir column into said regeneration column, this transferring step being of a lower portion of said regeneration reservoir column to raise said regeneration column by resin movement at a lower portion thereof.

30. The method of claim 22, wherein said passing step includes creating a pressure drop between about 2 psi up to about 5 psi or more for each foot of effective height of said loading column during said flowing step, said flowing step being a downflowing step, forming a slurry of feed liquid and said spent resin from an upper portion of said loading column, transferring spent resin to said regeneration reservoir column by moving said slurry to an upper portion of said regeneration reservoir column, and restricting passage of feed liquid out of said loading column.

31. The method of claim 22, wherein said combination of steps regenerates said movable packed ion exchange resin bed to about 80% or more of its exchange capacity at the time of rinsed resin transferring step, resulting in a step of minimizing reverse ion exchange by acidic or basic conditions within said loading column.

32. A high capacity moving-bed ion exchange method, comprising:

providing a movable ion exchange resin bed within a plurality of columns, said plurality including a loading column, a loading reservoir column, a regeneration column, and a regeneration reservoir column;

flowing a raw phosphoric acid feed liquid through said loading column to remove ionic materials therefrom;

passing spent resin beads from and out of said loading column to said regeneration reservoir column;

transferring a portion of loading reservoir column having purged and rinsed resin into said loading column;

transferring a portion of said regeneration column into said loading reservoir column;

purging said loading reservoir column to remove liquid from intersticies of resin therein and thereby semi-dry the resin;

rinsing said semi-dry resin by moving rinse liquor through the semi-dry resin in the loading reservoir;

transferring a portion of said regeneration reservoir column into said regeneration column; and regeneration at least a portion of said regeneration column by passing a regenerating solution therethrough;

wherein said rinsing step includes a resin raising step by pumping said rinse liquor together with a plug of resin upwardly into said loading reservoir column.

33. The method of claim 32, wherein said pumping of a plug resin is generally accompanied by passing said rinse liquor through the semi-dry resin.

34. A high capacity moving-bed ion exchange method, comprising:

providing a movable ion exchange resin bed within a plurality of columns, said plurality including a loading column, a loading reservoir column, a regeneration column, and a regeneration reservoir column;

flowing a raw phosphoric acid feed liquid through said loading column to remove ionic materials therefrom;

passing spent resin beads from and out of said loading column to said regeneration reservoir column;

transferring a portion of loading reservoir column having purged and rinsed resin into said loading column;

transferring a portion of said regeneration column into said loading reservoir column;

purging said loading reservoir column to remove liquid from intersticies of resin therein and thereby semi-dry the resin;

rinsing said semi-dry resin by moving rinse liquor through the semi-dry resin in the loading reservoir;

transferring a portion of said regeneration reservoir column into said regeneration column; and regenerating at least a portion of said regeneration column by passing a regenerating solution therethrough, wherein each of said steps is repeated whereby in one of the flowing steps phosphoric acid liquid is subjected to a cationic exchange resin to remove magnesium and calcium cations therefrom, and in another of the flowing steps phosphoric acid liquid is subjected to anionic exchange resin to recover uranium values therefrom.

35. The method of claim 34, wherein said one flowing step precedes said another flowing step.

36. The method of claim 34, wherein said one flowing step also recovers uranium values from the phosphoric acid liquid.

37. The method of claim 34, wherein said rinsing step includes a resin raising step by pumping said rinse liquor together with a plug of resin upwardly into said loading reservoir column.

38. The method of claim 37, wherein said pumping of a plug of resin is generally accompanied by passing said rinse liquor through the semi-dry resin.

39. The method of claim 22, 23 or 34, wherein said flowing step is at a rate such that the volume ratio of raw phosphoric acid feed liquid treated is between about ½ to 30 volumes of feed liquid for each volume of resin in the loading column.

40. The method of claim 22, 32 or 34, further comprising another purging step to remove liquid from intersticies of resin in said regeneration reservoir column and semi-dry the resin, and another rinsing step to move rinse liquor through the semi-dry resin in the regeneration reservoir column.

41. The method of claim 40, wherein said loading reservoir purging and rinsing steps are carried out generally simultaneously with said regeneration reservoir purging and rinsing steps.

42. The method of claim 40, wherein said another rinsing step is repeated a plurality of times to incrementally treat the resin.

43. The method of claim 40, wherein said another purging step includes injecting pressurized fluid through and out of said regeneration reservoir column.

44. The method of claim 22, 32 or 34, wherein, by said rinsing step, said resin is fluffed up to simulate free flow of resin beads and remove air from resin intersticies and residual liquid from resin bead surfaces.

45. The method of claim 22, 32 or 34, wherein said rinsing step is repeated a plurality of times to incrementally treat the resin.

46. The method of claim 22, 32 or 34, wherein said purging step is generally downward through said loading reservoir column, and said rinsing step is generally upward into said loading reservoir column.

*47. A high capacity moving bed ion exchange method, comprising:*

*providing a movable ion exchange resin bed within a plurality of columns, said plurality including a loading column, a loading reservoir column, a regeneration column, and a regeneration reservoir column;*

*flowing a raw aqueous phosphoric acid feed liquid downwardly through said loading column to remove ionic materials therefrom;*

*removing purified phosphoric acid from the botton portion of said loading column;*

*passing spent resin beads out of the top portion of said loading column to said regeneration reservoir column;*

*transferring a portion of the resin in said regeneration reservoir column into said regeneration column;*

*regenerating at least a portion of the resin in said regeneration column by passing a regenerating solution therethrough;*

*transferring a portion of the regenerated resin from the regeneration column with regenerating solution therein to the loading reservoir column;*

*purging said loading reservoir column to remove liquid from intersticies of resin therein;*

*rinsing said purged resin by moving rinse liquor through the resin in the loading reservoir; and*

*transferring a portion of purged and rinsed resin from the loading reservoir column into the bottom portion of said loading column;*

*wherein said purging and rinsing steps for preparing resin for transfer from said loading reservoir column to said loading column include the following sequence:*

*(a) passing air through the resin in said loading reservoir column to purge liquid therefrom until the resin is in semi-dry condition,*

*(b) adding to said semi-dry resin purified phosphoric acid after passage thereof through said loading column, and*

*(c) removing air entrapped within resin in said loading reservoir column before transferring said portion of the purged and rinsed resin to said loading column bottom portion.*

* * * * *